J. C. CROMWELL.
METHOD OF SAWING AND APPARATUS THEREFOR.
APPLICATION FILED OCT. 1, 1915.
1,197,348.
Patented Sept. 5, 1916.
4 SHEETS—SHEET 1.
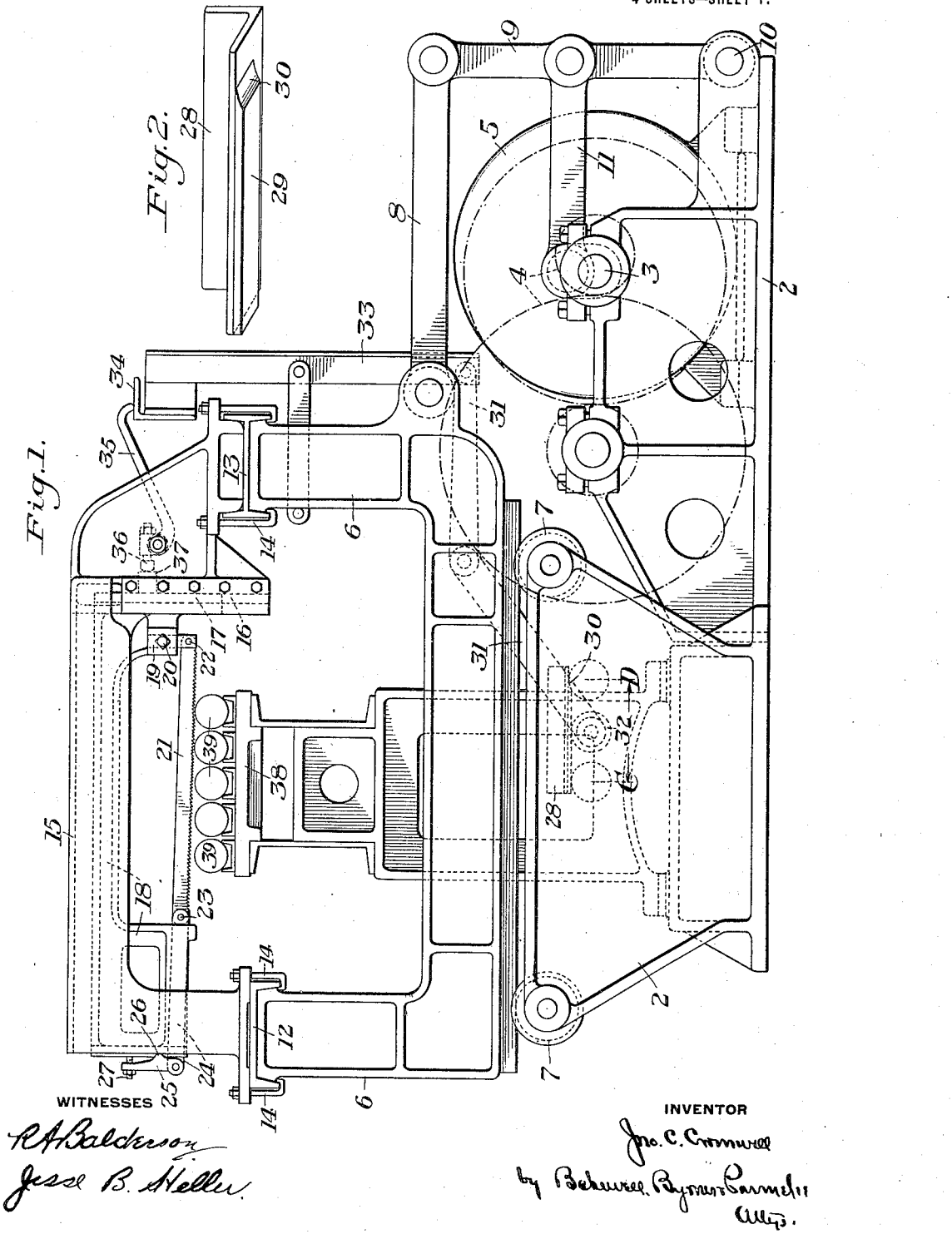

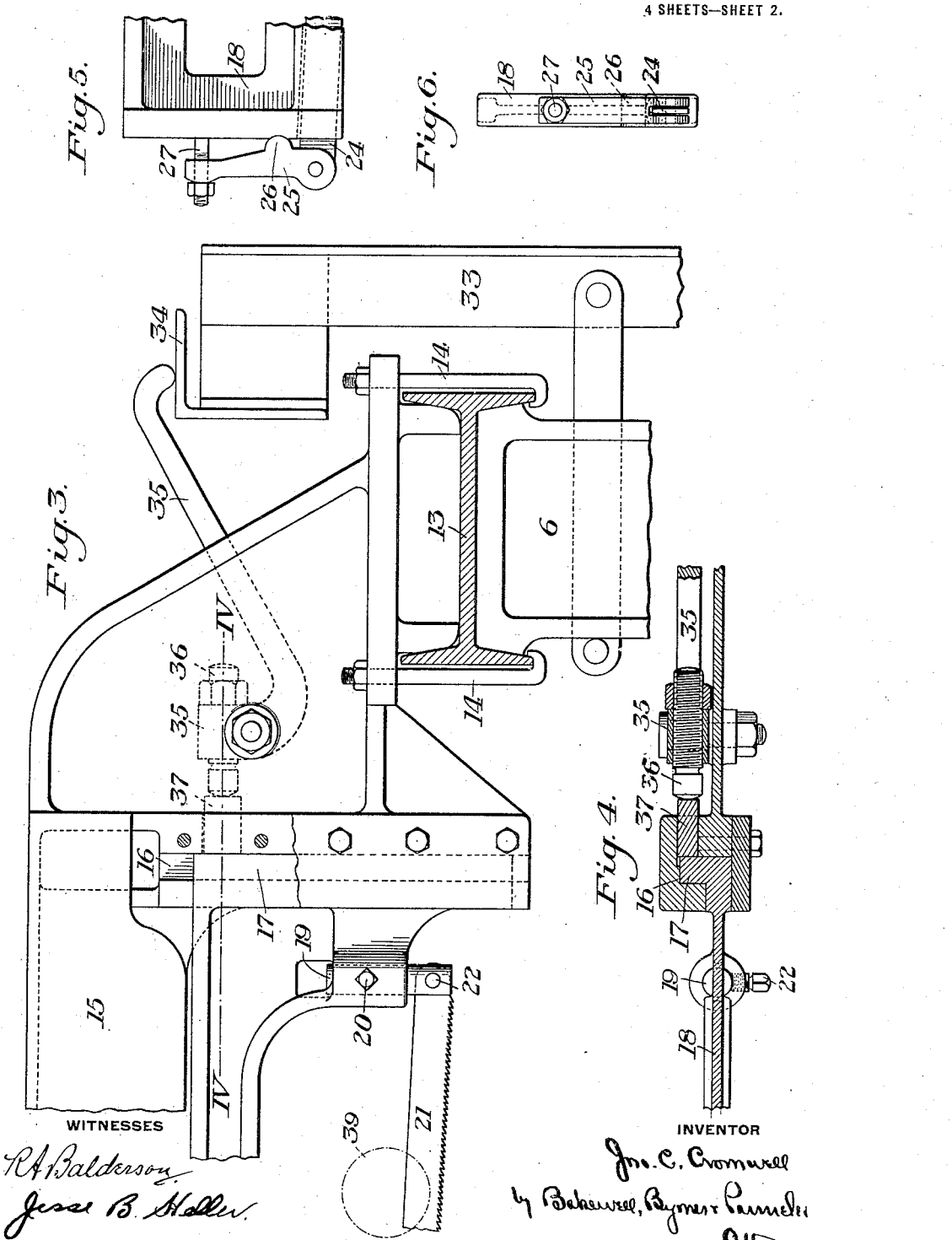

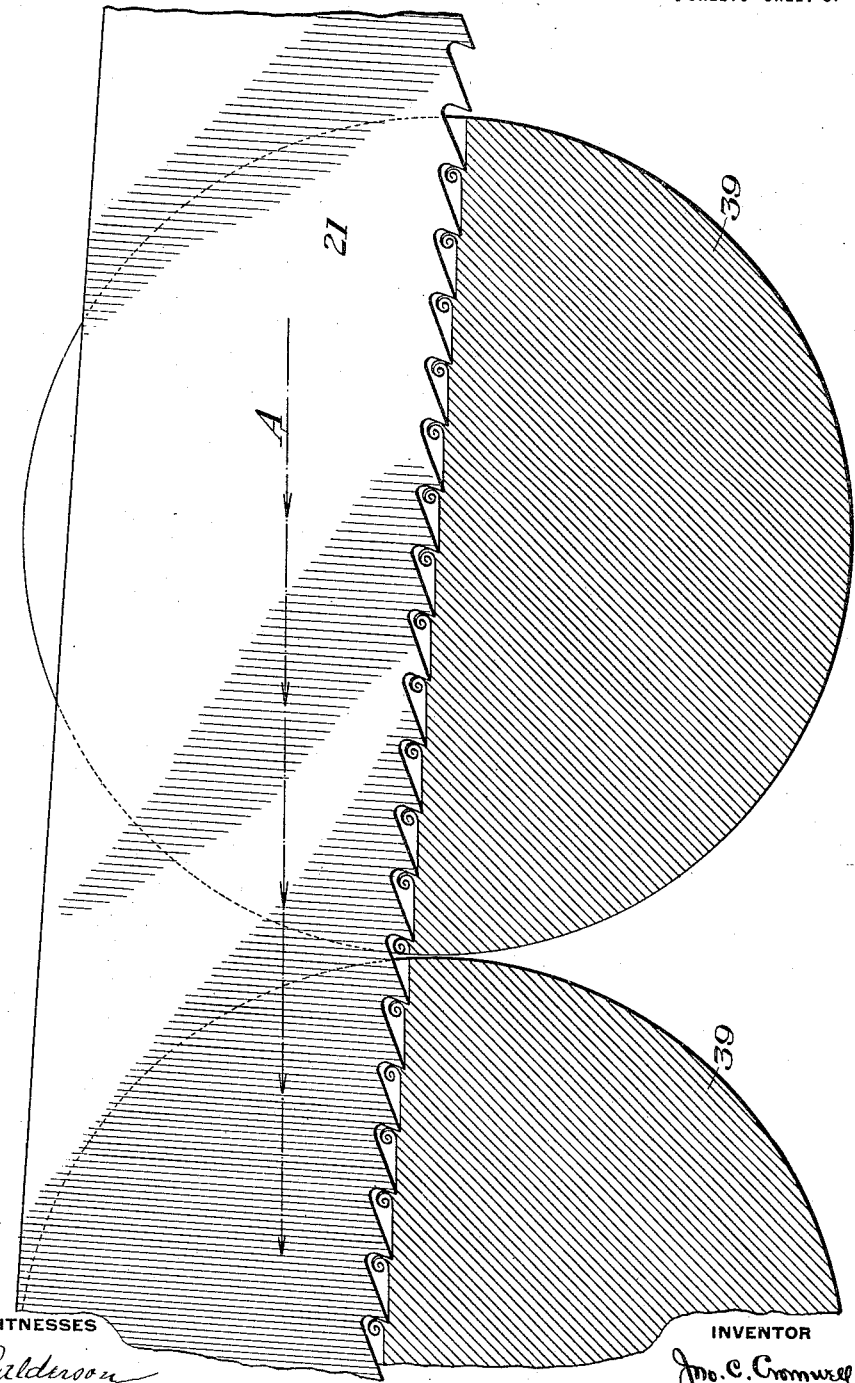

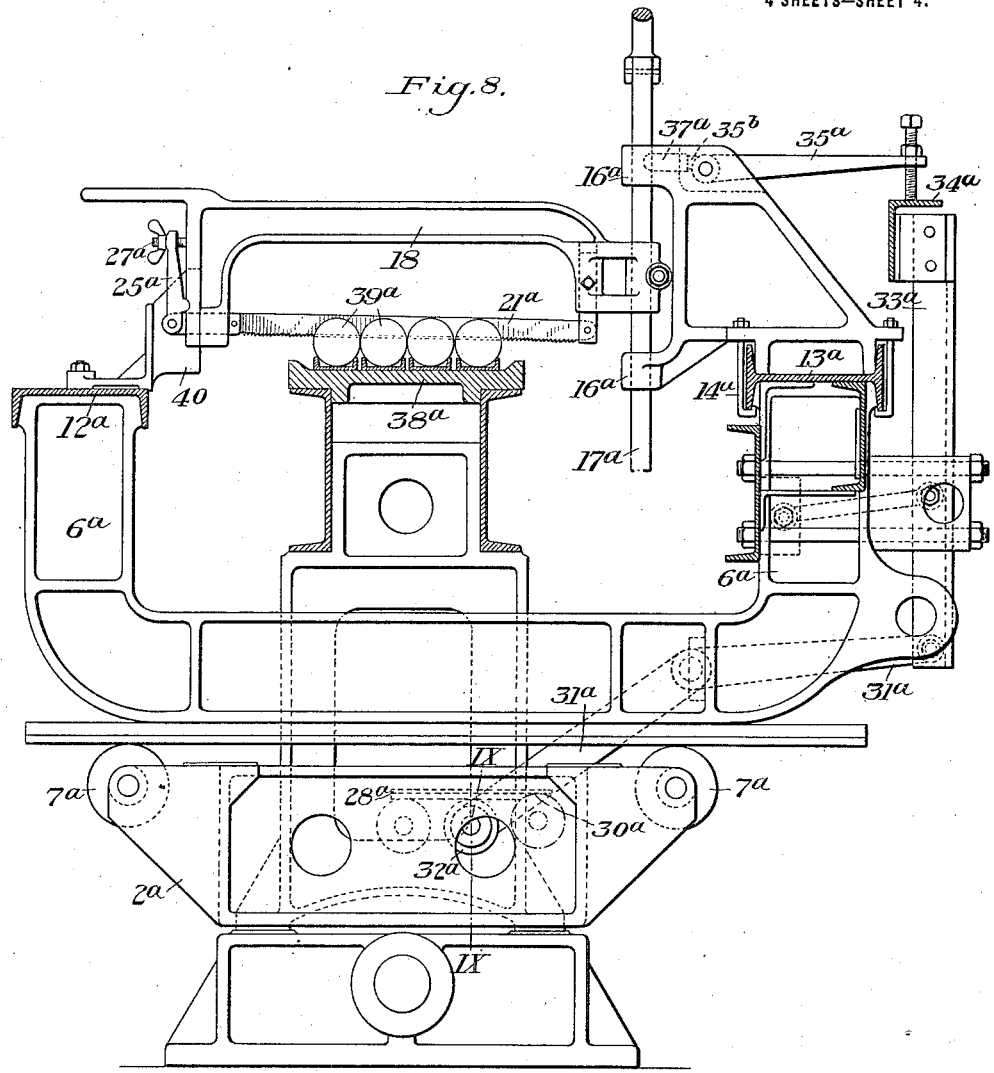
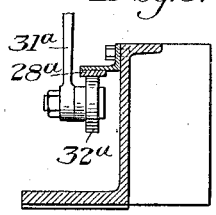

UNITED STATES PATENT OFFICE.

JOHN C. CROMWELL, OF CLEVELAND, OHIO.

METHOD OF SAWING AND APPARATUS THEREFOR.

1,197,348.  Specification of Letters Patent. Patented Sept. 5, 1916.

Application filed October 1, 1915. Serial No. 53,614.

*To all whom it may concern:*

Be it known that I, JOHN C. CROMWELL, a citizen of the United States, residing at Cleveland, in the county of Cuyahoga and State of Ohio, have invented a new and useful Improvement in Methods of Sawing and Apparatus Therefor, of which the following is a full, clear, and exact description, reference being had to the accompanying drawings, forming part of this specification, in which—

Figure 1 is a side elevation of one form of apparatus for carrying out my invention; Fig. 2 is a detail perspective view of a cam plate for locking the saw; Fig. 3 is a detail view partially in section of a portion of Fig. 1, on an enlarged scale; Fig. 4 is a detail sectional view on the line IV—IV of Fig. 3; Fig. 5 is a detail sectional view of the saw-tensioning device; Fig. 6 is an end view thereof; Fig. 7 is a diagram illustrating the cutting action of each of the teeth of the saw; Fig. 8 is a view similar to Fig. 1, showing a modified form; and Fig. 9 is a detail sectional view on the line IX—IX of Fig. 8.

This invention relates to an improved method of sawing and the apparatus therefor, and is more particularly designed to provide an efficient method of cutting a plurality of bars or rods.

Heretofore, in all machine hack saws known to me the saw blade has been secured to a pivoted frame which is reciprocated over the article to be cut, the saw being held in contact with the piece by means of the weight of the frame or an auxiliary weight. I have recently made numerous tests with machines of this character and have found that very few of the teeth of the saw remove metal while cutting, and have also found that the haphazard method of sawing by merely reciprocating the saw across the piece to be cut can be greatly improved by arranging the mechanism so that the saw will remove a definite quantity of metal during each reciprocation. I accomplish this by placing the saw in such a position that the line of the teeth thereof is at a predetermined angle to the direction of reciprocation of the saw, and during the reciprocation of the saw maintaining the line of the teeth at such predetermined angle. The depth of the cut for each reciprocation of the saw is determined by the length of the stroke of the saw and the angle of the line of the teeth with relation to the direction of reciprocation of the saw.

The precise nature of my invention will be best understood by reference to the accompanying drawings which will now be described, it being premised, however, that various changes may be made in the details of construction and the general arrangement of the parts without departing from the spirit and scope of my invention as defined in the appended claims.

Referring to the accompanying drawings, the numeral 2 designates the main frame of the machine, and journaled in this frame is a crank shaft 3, which may be driven through gear connections 4 by a motor 5.

6 designates a saw frame which is adapted to reciprocate over the rollers 7 in the main frame 2. Connected to the frame 6 is a link 8, which is, in turn, connected to one end of a lever 9, pivoted at 10 to the frame 2, and 11 is a second link connected to the lever 9 and to a crank on the crank shaft 3.

The frame 6 is similar to the frame shown in one of the drawings of my copending application, Serial No. 4460, filed July 17, 1915, and is provided with a channel member 12, at one side and an I-beam 13 at the other side, which are arranged to secure a plurality of frames 6 to one another in parallelism. Mounted on the channel 12 and the I-beam 13 and connected thereto by means of hook bolts 14 is a main saw frame 15, which is adapted to be reciprocated with the frame 6 through the medium of the link connections previously described. The main saw frame 15 is provided with a vertical L-shaped guiding recess 16 for the reception of the flanged end 17 of the auxiliary saw frame 18, whose other end extends through an opening in the end of the main saw frame 15. Adjustably mounted in a vertical slot in the auxiliary saw frame 18 is a rod 19, which is held in its adjusted position by means of a set screw 20. The lower end of this rod 19 is slotted for the reception of a hack saw blade 21; and 22 is a pin for securing the hack saw blade to the end of the rod 19. The other end of the hack saw blade 21 is pivotally connected at 23 to one end of an extension member 24, which is seated in a slot in the bottom of the auxiliary saw frame 18. The end of this extension rod 24 is pivotally connected to a dog 25, having a projection 26, seated in a recess in the end of the auxiliary saw frame 18; and 27 is an adjusting screw passing through the end of the dog 25, which engages the end of the auxiliary saw frame 18 for adjusting the tension of the saw blade 21.

The numeral 28 designates a plate, secured to the frame 2 and which is provided with a flat bearing face 29 and a cam face 30.

31 is a lever pivoted to the frame 6, one end thereof having a roller 32 which is adapted to roll along the surfaces 29 and 30. The other end of the lever 31 is connected to a bar 33, having an angle-iron 34 at the upper end thereof. Pivotally mounted on the saw frame 6 is a bell crank 35, one arm of which rests on the angle-iron 34; and 36 is an adjustable screw in the other end of the bell crank 35, which normally rests against a friction brake member 37, which is adapted to engage the projection 17 on the auxiliary saw frame 18, to lock it in its adjusted position.

If the device is to be used in connection with a gang of hack saws, such as shown in my pending application, the angle-iron 34 will extend through the whole length of the machine to actuate the bell crank lever of each of the saws.

The numeral 38 designates a work holder which is placed adjacent to the machine shown in Fig. 1, and if the device is used in connection with a gang of hack saws, there will be a work holder between adjacent machines, and as shown in the drawings, the work holder is arranged to hold a plurality of rods 39.

It will readily be seen by an insepection of the drawings and particularly Fig. 7, that the saw is reciprocated in a horizontal direction, designated by the reference character A, while the teeth of the saw lie in a line at an angle to the direction A, so that when the saw is moved forwardly, each of the teeth will remove a chip of metal in a horizontal line, while the chips removed by adjacent teeth of the saw will be in different horizontal lines.

The operation of the machine is as follows: The various connections are so arranged that the frame 6, together with the main saw frame 15 and the auxiliary saw frame 18, will be reciprocated from C to D, as shown in Fig. 1, the auxiliary saw frame 18 being clamped in the main frame 15, so that each tooth will cut its proper proportion from the metal of the blank or blanks. On the return stroke, the teeth of the saw will be held clear of the metal and thereby avoiding the wear caused by dragging the teeth over the bottom of the cut. Immediately after the roller 32 passes from the plane surface 29 of the cam 28 to the cam surface 30, the friction brake 37 will be released and permit the auxiliary saw frame 18 to drop until the saw rests on the bottom of the cut previously made. The frames will then be moved in a forward direction and as soon as the roller 32 passes on to the plane surface 29, the friction brake will be brought into operation and will lock the auxiliary saw frame in the main saw frame to positively hold the saw from vertical movement and thereby cause each tooth to remove a chip in a horizontal plane or a plane parallel with the plane of movement of the frame 6.

The depth of the cut, as before stated, is determined by the length of the stroke together with the angle of the line of the teeth with relation to the direction of movement of the saw frame, which can be adjusted by shifting the rod 19 to raise or lower the heel of the saw blade 21, and vary the angle of the plane of the saw teeth.

In Fig. 8 I have shown another form of structure, in which I have used the same reference characters to designate similar parts. In this construction the saw frame 18 is supported directly upon a slide rod $17^a$, which is adapted to slide in guides $16^a$. The guide rod $17^a$ to which the saw frame 18 is connected, is held from vertical movement while the saw is being moved backwardly and forwardly, by means of a friction brake member $37^a$, which is actuated by a cam $35^b$ on a lever $35^a$. This lever is actuated in the same manner as the lever 35 shown in Figs. 1 and 3. The front end of the saw frame 18 reciprocates between guide blocks 40, which will maintain it from lateral movement. The operation of the modification shown in Fig. 8 is the same as the operation of the device shown in the other figures.

The advantages of my invention result from the provision of a method of maintaining the plane of the teeth of a saw at a predetermined angle with relation to the plane of movement of the saw, together with mechanism for automatically moving the saw for the next cut and locking it in its adjusted position, without varying the angle of the plane of the saw teeth with relation to the plane of movement of the saw.

A further advantage results from the provision of means for holding the saw in its elevated position during the return stroke, and thereby preventing the saw teeth from dragging over the bottom of the cut previously made, which will materially reduce the wear on the saw.

I claim:

1. The method of sawing, comprising the step of reciprocating the saw across the article to be cut, during the cutting strokes moving the saw in a direction at an angle to the line of the teeth of the saw, and after each cutting stroke positioning the article and the saw relatively to each other for the next cut; substantially as described.

2. The method of sawing, comprising the steps of reciprocating the saw across the article to be cut, and during the cutting strokes moving the saw in a direction at an angle to the line of the teeth of the saw, and between the cutting strokes moving it at an angle to the cutting movement and toward the article to be cut; substantially as described.

3. In the method of sawing, the step of moving the saw forwardly in one direction for cutting while maintaining the line of the teeth of the saw at an angle to said direction, then reversing the movement of the saw and at the end of such movement moving it at an angle to the cutting movement and toward the article to be cut, substantially as described.

4. In sawing apparatus, a saw frame, a saw having a plurality of teeth in approximately the same line connected thereto, means for reciprocating the saw frame in a direction at an angle to the line of the teeth, and means for maintaining the line of the teeth of the saw at an angle to the direction of the movement of the saw and means whereby the saw and the object to be cut may be properly positioned for a new cut after each cutting stroke, substantially as described.

5. In a sawing apparatus, a saw frame, means for reciprocating the saw frame, an auxiliary saw frame mounted in the first mentioned saw frame and adapted to reciprocate therewith, a saw blade connected to the auxiliary saw frame, and means for maintaining the line of the teeth of the saw at an angle to the direction of reciprocation of the saw frame, together with means whereby the saw and the object to be cut may be properly positioned for a new cut after each cutting stroke, substantially as described.

6. In a sawing apparatus, a saw frame, means for reciprocating the saw frame, an auxiliary saw frame mounted in the first mentioned saw frame and adapted to reciprocate therewith, a saw blade connected to the auxiliary saw frame, means for maintaining the line of the teeth of the saw at an angle to the direction of reciprocation of the saw frame, and means for locking the auxiliary frame in the main saw frame, substantially as described.

7. In a sawing machine, a main saw frame, means for reciprocating the main saw frame, vertical guides in said saw frame, an auxiliary saw frame mounted in said guides and adapted to be reciprocated with the main saw frame, a hack saw mounted in the auxiliary saw frame, means for locking the auxiliary frame in the main frame, and means for adjusting the angle of the saw with relation to the direction of reciprocation of the main saw frame, substantially as described.

8. In a sawing apparatus, a saw frame, means for reciprocating the saw frame, means for causing the saw frame to reciprocate in a direct line, and means for lowering the saw frame at the end of the return stroke of the saw frame, substantially as described.

In testimony whereof, I have hereunto set my hand.

JOHN C. CROMWELL.

Witnesses:
HARRY SUSSER,
ELEANOR HADLEY.

Copies of this patent may be obtained for five cents each, by addressing the "Commissioner of Patents, Washington, D. C."